United States Patent [19]

Smoravek

[11] 4,313,359

[45] Feb. 2, 1982

[54] DEVICE FOR CUTTING VERTICAL PAPER SHEETS

[75] Inventor: Miroslav Smoravek, Munich, Fed. Rep. of Germany

[73] Assignee: Siemens Aktiengesellschaft, Berlin & Munich, Fed. Rep. of Germany

[21] Appl. No.: 156,100

[22] Filed: Jun. 3, 1980

[30] Foreign Application Priority Data

Jun. 27, 1979 [DE] Fed. Rep. of Germany ....... 2925936

[51] Int. Cl.[3] ........................ B41J 11/70; B26D 1/20; B23D 19/02

[52] U.S. Cl. .......................................... 83/157; 83/81; 83/167; 83/375; 83/385; 83/482; 83/614; 83/455

[58] Field of Search ................. 83/374, 375, 378, 382, 83/385, 157, 165, 81, 167, 455, 614, 48; 400/621

[56] References Cited

U.S. PATENT DOCUMENTS 985,446 2/1911 Pease ................................ 83/591 X
3,951,252 4/1976 Selke et al. ....................... 83/482 X
4,099,434 7/1978 Hardouin ............................ 83/157
4,152,962 5/1979 Hendrischk .......................... 83/482

FOREIGN PATENT DOCUMENTS 2516476 10/1976 Fed. Rep. of Germany .
7812759 8/1978 Fed. Rep. of Germany .

*Primary Examiner*—Donald R. Schran
*Attorney, Agent, or Firm*—Hill, Van Santen, Steadman, Chiara & Simpson

[57] ABSTRACT

A device cuts vertically fed paper against a cutting edge by means of a carriage driven cutting wheel. There is a chute means downstream from the cutting edge and secured to a pivotable guideway bar, rotated by movement of the carriage during cutting operation. The paper is held against the cutting edge during cutting on one side by the chute means which tilts the paper to be cut toward a deposit tray and on the other side by a pivotable flap biased by a pressure roller mounted on the carriage. In the non-cutting mode, the flap and chute are substantially coextensive to help provide a gap-free pathway for paper being fed into the device.

9 Claims, 4 Drawing Figures

DEVICE FOR CUTTING VERTICAL PAPER SHEETS

BACKGROUND OF THE INVENTION

1. Field of the Invention

The invention relates to a device for cutting vertical paper sheets and, more particularly, for cutting a web of paper in a printer.

2. The Prior Art

In the case of paper being discharged from printers, both individual forms and endless paper webs pass through the printers. Here endless paper is being used, it is necessary to cut the paper off after it has been printed and eject the sheets onto a place of deposit. Sheet cutting is carried out automatically in these systems by means of a cutting wheel which moves on a carriage against a stationary cutting edge. Cutters of this type are described in German GM No. 7812759 and U.S. Pat. No. 4,152,963, corresponding to German OS No. 2655832. The devices disclosed in these publications generally comprise carriage driven stepped rolls of which the larger portions serve to shear or tear paper along the cutting edges. Pressure rolls serve to retain the paper against the cutting edge during cutting. These devices do not include guide surfaces for positioning of the paper being fed and cut in the cutter.

One drawback with known cutter arrangements is in the guidance of paper through the cutter device. Usually a printer used both for printing endless paper and for printing individual forms has different paper delivery guides for the respective modes. In practice, the different paper guides are switched into operating position depending on the particular mode. This requires an additional control mechanism. Also, a gap is necessary between the cutting edge and the beginning of the delivery guide walls through which the cutting wheel or cutting knife can be conducted. This gap may disrupt smooth passage of the paper through the cutter device.

A further drawback in known cutter arrangements is that delivery guide walls, which open onto a paper deposit, do not precisely direct movement of the paper and may extend along a very small angle with respect to the cutting edge. Thus, there is no tensioning of the paper sheet about to be cut so as to be particularly undesirable when cutting thin or perforated paper.

SUMMARY OF THE INVENTION

The instant invention provides for a cutter device which requires no special drive or control mechanisms to operate in different modes and which make possible a problem-free passage of paper through the cutter.

Paper is fed vertically upward into a cutter device over a cutting edge surface. A carriage, movable perpendicular to the paper feed, carries a cutting wheel which when run along the cutting edge shears or tears the paper. Chute means serve to guide the paper sheet before and after it is cut from the paper downstream from the cutting edge. The chute means is connected with a guideway extending parallel with the cutting edge and over which the carriage traverses. The guideway is made to pivot relative to the cutter frame such that, when the cutting wheel is being passed along the cutting edge, the guideway pivots to position the chute means for tensioning of the sheet to be cut and delivery of the cut sheet into a tray or like place of deposit. Paper to be cut is fed through a substantially gap-gree pathway in the cutter. A pivotal flap and upper wall of the chute means act as upper guide surfaces; and the cutting edge and a lower wall of the chute act as lower guide surfaces. The pivotal flap also secures the paper against the cutting edge during cutting for precise and clean shearing of the paper sheet.

DESCRIPTION OF THE PREFERRED EMBODIMENT

Figure 1:
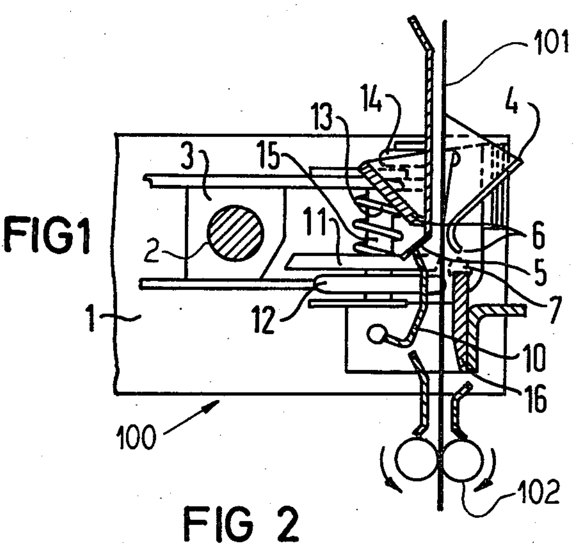
FIG. 1 is a cross-sectional view of a paper cutter in accordance with the present invention in a non-cutting mode.
Figure 2:
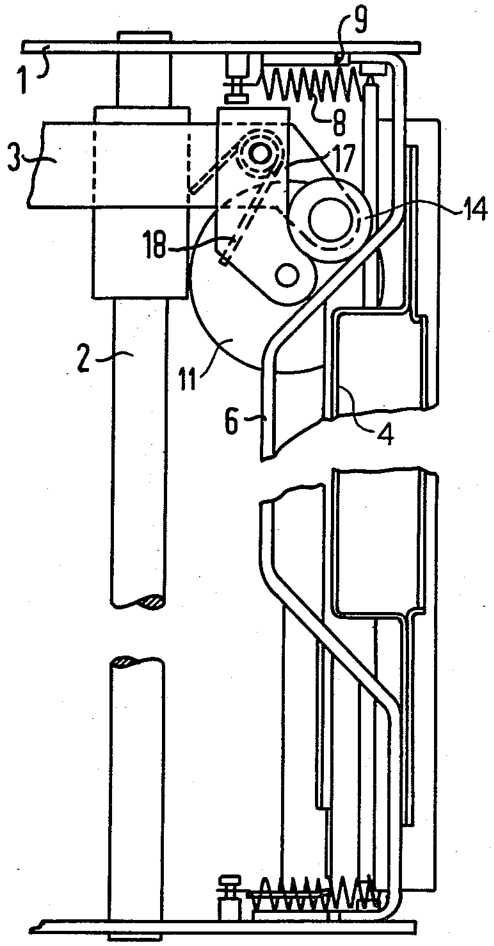
FIG. 2 is a partial front view of the paper cutter as shown in FIG. 1.

Herein described is a paper cutter device 100 into which paper 101 is vertically drawn from an endless roll or web (not shown). FIGS. 1 and 2 illustrate the cutter device 100 in a non-cutting mode of operation, i.e., during printing by a printer element (not shown) before cutting or during paper feed through delivery rolls 102 after a cutting operation.

The cutter 100 contains a cutting carriage 3 which is driven by conventional means for substantially horizontal reciprocable movement along a slide rod 2 secured in end walls of a frame 1. A bar 6 extends between the frame end walls adjacent the slide rod. The bar acts as a guideway and is secured by pins for pivotable movement relative to the frame 1. A chute means 4 is mounted upon the guideway 6 opposed from the carriage. An upstream end of the chute means 4 extends interiorly of the guideway and is formed with an upturned or diverging wall portion 5 which serves as a stop against the free end of a flap 10. The flap 10 is pinned for pivotal movement at its opposite end and at rest extends substantially parallel to, but spaced from, a stationary planar surface 16, the downstream edge of which serves as a cutting edge.

The cutting carriage 3 contains a cutting wheel 11 and a pressure roller 12 fitted on a common axle 15. A coil spring 13 mounted concentrically about the axle presses against the cutting wheel to bias it against the cutting edge. The pressure roller 12 is located on the other side of the cutting wheel from the spring 13 in line with the planar surface of wall 16. The axle 15 is seated at one end thereof in an arm 17 extending from the carriage 3. The arm 17 is forked at the end containing the axle with the axle seated in the oblong opening of the fork. This permits tilting of the axle 15 in a direction parallel to the movement of the cutting carriage so that the cutting wheel 11 may assume proper alignment with the cutting edge. The arm 17 is pinned for pivotal movement adjacent its other end and a coil spring 18 engages with the arm 17. The spring 18 serves to bias the pressure roller 12 against planar surface 16.

Further journaled at the lower end of the carriage 3 is a guide roller 14. The guide roller passes along the guideway 6 when the carriage 3 moves in the cutter 100. As the guide roller travels over the guideway, the guideway is biased outward, bringing the chute means 4 into proper position for sheet cutting and delivery.

As shown in FIGS. 1 and 2, during paper feed, the guideway is in an at rest position. Twin tension springs 8 secured at opposed ends of the guideway bias the guideway in this position against stop surfaces 9 fitted on the opposed end walls of the cutter frame.

Figure 3:
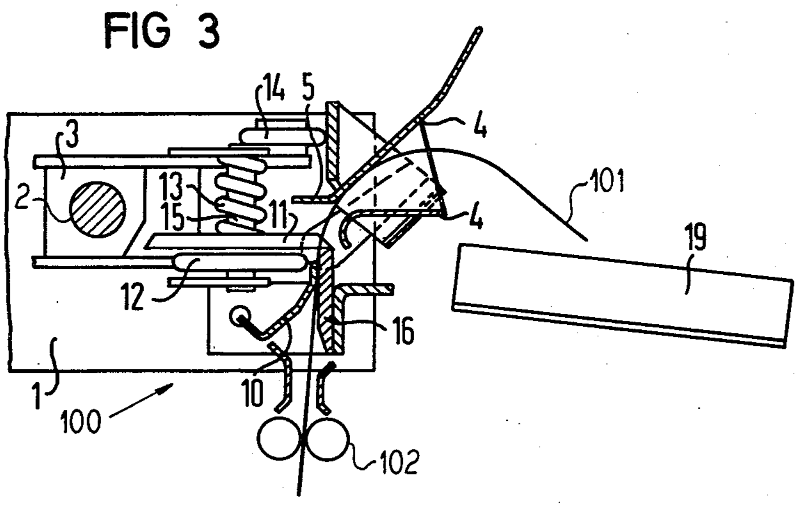
FIG. 3 is a cross-sectional view of the paper cutter of FIG. 1 in a cutting mode.
Figure 4:
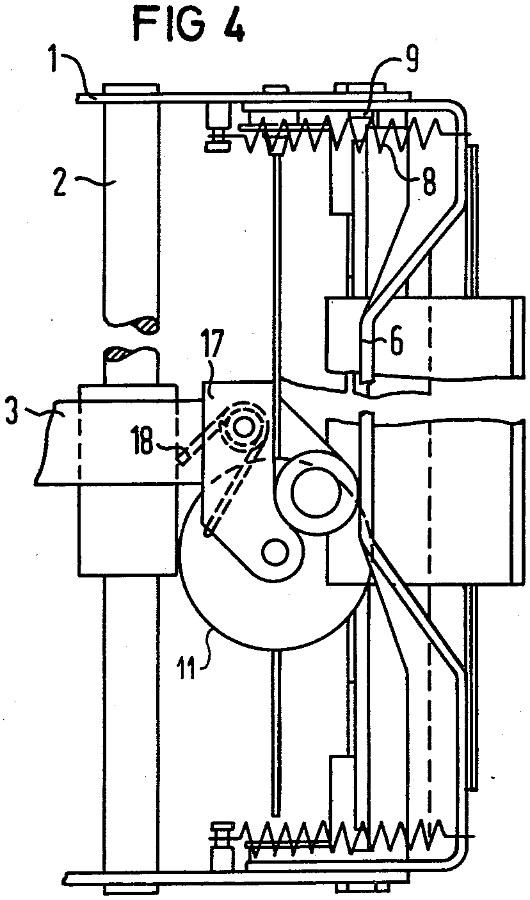
FIG. 4 is a partial front view of the paper cutter as shown in FIG. 3.

Cutting operation is triggered by known control means, such as a pulse signal to the cutter carriage drive after a predetermined amount of paper has been inserted into the cutter 100 past the cutting edge. During cutting, the carriage moves along the rod 2 such that the cutting wheel 11 passes perpendicularly to the plane of the inserted paper as illustrated in FIGS. 3 and 4. As the carriage moves, the guide roller 14 is conducted over the guideway 6 passing the guideway against the springs 8 in the direction of a substantially horizontal tray 19 or other form of paper deposit. Pressure roller 12 engages with the upper surface of the flap 10 and presses the flap against the adjacent surface of the paper. The flap serves as a pad for the pressure roller to hold the paper firmly against the planar surface 16 on one side of the cutting line formed by passage of the cutting wheel along the cutting edge. At the same time, on the other side of the cutting wheel, the paper 101 is being tilted along the surfaces of the chute means 4 which has been rotated outward along with the guideway. This tilting serves to tension the paper across the cutting edge, such that the combined effect of holding the paper on one side of the cutting edge and tensioning it on the other side significantly improves the cutting operation of the cutting wheel 11. Proper pressure of the cutting which against the cutting edge is maintained by the coil spring 13.

The chute means 4 directs the paper portion being cut toward the tray 19. After completion of the cutting operation, the cut sheet falls into the deposit 19 and the cutting carriage 3 is again positioned at one end of the cutter 100 in its non-cutting mode. The guideway bar 6 returns under the influence of the springs 8 into engagement with the stops 9 to its at rest position shown in FIGS. 1 and 2 such that a substantially gap-free pathway is again provided for the successive feed of paper into the cutter.

Although various minor modifications may be suggested by those versed in the art, it should be understood that I wish to embody within the scope of the patent warranted hereon all such modifications as reasonably and properly come within the scope of my contribution to the art.

I claim as my invention:

1. A device for cutting vertical paper sheets comprising a planar surface over which paper is conducted having a cutting edge, a carriage means having a cutting wheel journaled on the carriage for running along said cutting edge and a pressure roller for running over said planar surface, a bar engageable by said carriage adjacent said cutting edge and having mounted thereto a chute means for receiving paper past said cutting edge, and means for rotating said bar in response to engagement by said carriage when said cutting wheel is running along said cutting edge such that the chute means and pressure roller serve to hold the paper against the cutting edge during cutting.

2. The device according to claim 1, further comprising a rotatable flap extending substantially parallel to and spaced apart from said planar surface, said flap having a free end engaging with an upstream portion of said chute means during passage of paper over said planar surface to make a gap-free pathway for said paper and lying between said pressure roller and said planar surface during cutting.

3. The device according to claim 1, further comprising a deposit means for receiving paper sheets, said chute means directing paper to said deposit means during cutting.

4. The device according to claim 1, wherein said cutting wheel is seated on an axle, said axle being mounted on one end in an oblong hole in said carriage, enabling tilting of said axle.

5. The device according to claim 1, further comprising a guide roller journaled on said carriage, said bar having guideway means for passage of said guide roller therealong, said guideway having generally planar end portions and a relatively upraised mid-section over which said guide roller passes during cutting.

6. A device for cutting vertically directed paper comprising a cutting wheel and a pressure roller journaled in a carriage reciprocably movable in a direction perpendicular to the paper, a planar surface over which paper is conducted having a cutting edge along which runs said cutting wheel during cutting, a bar means adjacent said cutting edge engageable by a guide roller journaled in said carriage and having fixed thereto a chute means, said bar means being pressed against a stop means by biasing means and being rotatable away from said stop means by passage of said guide roller therealong during cutting toward a paper deposit, and a flap adjacent said planar surface having a free end engaging an upstream portion of said chute means during non-cutting as part of a gap-free pathway for paper being conducted over said planar surface, said flap being rotatable so as to be pressed against said planar surface by said pressure roller during cutting.

7. The device according to claim 6, wherein said pressure roller and said cutting wheel are seated on a common axle, said axle being freely mounted at one end in an oblong hole formed in the carriage.

8. The device according to claim 7, further comprising a spring adjacent said axle for pressing said cutting wheel against said cutting edge.

9. The device according to claim 6, further comprising a spring means for pressing said pressure roller against said planar surface.

* * * * *